US008138701B2

(12) United States Patent
Knezevic et al.

(10) Patent No.: US 8,138,701 B2
(45) Date of Patent: Mar. 20, 2012

(54) METHOD FOR DETERMINING THE POSITION OF A ROTOR OF AN ELECTRIC MOTOR WITHOUT SENSORS

(75) Inventors: Jovan Knezevic, Ingolstadt (DE); Wolfgang Schulter, Meersburg (DE); Gernot Etzlstorfer, Neuburg (DE); Erich Liepold, Kösching (DE)

(73) Assignee: Conti Temic Microelectronic GmbH, Nuremberg (DE)

( * ) Notice: Subject to any disclaimer, the term of this patent is extended or adjusted under 35 U.S.C. 154(b) by 604 days.

(21) Appl. No.: 11/919,017

(22) PCT Filed: Apr. 19, 2006

(86) PCT No.: PCT/DE2006/000682
§ 371 (c)(1),
(2), (4) Date: Oct. 22, 2007

(87) PCT Pub. No.: WO2006/111144
PCT Pub. Date: Oct. 26, 2006

(65) Prior Publication Data
US 2009/0174354 A1    Jul. 9, 2009

(30) Foreign Application Priority Data

Apr. 20, 2005 (DE) .......................... 10 2005 018 526

(51) Int. Cl.
*H02P 6/00* (2006.01)
(52) U.S. Cl. ................ 318/400.32; 318/254.1; 318/720; 318/721
(58) Field of Classification Search ............. 318/400.32, 318/254.1, 720, 721
See application file for complete search history.

(56) References Cited

U.S. PATENT DOCUMENTS

| | | | | |
|---|---|---|---|---|
| 3,535,626 A | * | 10/1970 | Nishikawa et al. | 324/252 |
| 3,806,785 A | * | 4/1974 | DeValroger et al. | 318/400.2 |
| 3,818,343 A | | 6/1974 | Galli et al. | |
| 4,684,858 A | * | 8/1987 | Ma et al. | 388/820 |
| 5,023,527 A | * | 6/1991 | Erdman et al. | 318/400.34 |
| 5,821,713 A | * | 10/1998 | Holling et al. | 318/400.32 |
| 5,898,288 A | * | 4/1999 | Rice et al. | 318/685 |

(Continued)

FOREIGN PATENT DOCUMENTS

DE        42 17 265        12/1993

(Continued)

OTHER PUBLICATIONS

Consoli A et al: "Sensorless position control of DC actuators for automotive applications", Industry Applications Conference, 2004. 39$^{th}$ IAS Annual Meeting. Conference Record of the 2004 IEEE Seatle, WA, USA Oct. 3-7, 2004, Piscataway, NJ, USA, IEEE, BD. 2, 3. Oct. 2004. Seiten 1217-1224, XP010735160, ISBN: 0-7803-8486-5, Seiten 1218, Spalte 2, Zeile 10-Zeile 41; Abbildung 10.

*Primary Examiner* — Bentsu Ro
*Assistant Examiner* — Thai Dinh (57) ABSTRACT

Disclosed is a method for detecting the current position of a rotor, in particular the angle of rotation of the rotor, an electromotor and a method for detecting the speed and/or the angle of rotation of an electromotor. The speed of the electromotor is hereby implied inter alia from the number of zero crossings of a comparison signal of the armature resistances or respectively conductances determined continuously in time and the average values of the armature resistances or respectively conductances determined continuously in time.

14 Claims, 6 Drawing Sheets

U.S. PATENT DOCUMENTS

| | | | |
|---|---|---|---|
| 5,990,642 A * | 11/1999 | Park | 318/400.04 |
| 6,005,364 A * | 12/1999 | Acarnley | 318/632 |
| 6,144,179 A * | 11/2000 | Kessler et al. | 318/565 |
| 6,246,193 B1 * | 6/2001 | Dister | 318/400.33 |
| 6,617,816 B2 * | 9/2003 | Ohno et al. | 318/560 |
| 6,703,805 B2 * | 3/2004 | Griffitts | 318/459 |
| 7,180,255 B2 * | 2/2007 | Fulks et al. | 318/400.09 |
| 7,466,094 B2 * | 12/2008 | Kim | 318/400.32 |

FOREIGN PATENT DOCUMENTS

| | | |
|---|---|---|
| DE | 197 29 238 | 8/1998 |
| EP | 104 35 90 | 10/2000 |

* cited by examiner

METHOD FOR DETERMINING THE POSITION OF A ROTOR OF AN ELECTRIC MOTOR WITHOUT SENSORS

BACKGROUND OF THE INVENTION

The invention relates to a method for sensorless detection of the position of a rotor of a mechanically switched direct-current motor, and a method for sensorless detection of the speed and/or the angle of rotation of a mechanically switched direct-current motor.

EP 0 689 054 A1, EP 0 730 156 A1 and DE 39 35 585 A1 all disclose methods for determining the speed and/or the distances in mechanically switched direct-current motors.

It is moreover generally known to determine, evaluate and utilise the alternating component of the current, the ripple, of direct-current motors as a measure for the speed of the motor.

DE 35 27 906 A1 describes for example a so-called zero crossing method, in which the zero crossings of the current are determined after elimination of the uniform component.

Also in DE 4217265 the ripple of the armature current signal is evaluated, with the relative maximal and minimal values being determined.

It is also known to describe the method of direct-current motors by means of an electromechanical motor status model based on the motor equations. The motor equation $Uq(t)=c \cdot F \cdot n(t)$, also called generator equation, the motor equation $Mm(t)=c1 \cdot F \cdot Ia(t)$ and the electrical interrelationship $Uq(t)=UM(t)-Ia(t) \cdot Ra-L$ are likewise known.

The designations in the abovementioned equations mean in detail:
Uq the induced armature voltage;
c, c1, c2 the motor-specific variables, also known as motor constants,
F the magnetic flow,
n the speed,
ML the load torque,
Mm the motor torque and
MB the resulting acceleration moment,
Ia the motor or respectively armature current,
UM the motor terminal voltage,
Ra the armature resistance,
Rk the outer terminal resistance,
L the inductivity of the motor winding and
J the mass moment of inertia of the whole rotating arrangement including the parts to be moved.

EP 0 689 054 A1 discloses a method and a device for speed measuring and detecting and signal preparation of the commutation current of a direct-current motor. The method provides a direct-current coupling of the motor via a measured resistance in the motor current circuit. The detected signal is amplified by an amplifier and further processed by means of a filter section and a second amplifier. The resulting signal of the current ripple is phase-shifted via a phase shifter and combined with the non-phase-shifted signal in an analog adder. The resulting output signal is the current ripple signal, which is excluded as speed-relevant with respect to its frequency.

The incremental determination of the speed from the commutation ripple of the armature current is likewise to be inferred from the essay "Unconventional speed measuring and adjusting in direct-current motors" by Birk, Elektronik 25, 14.12.1984, pp. 71 ff.

The basic problems of recognition and evaluation of the current ripple, in particular the sensitivity to interference in mains voltage and double commutations, are also to be inferred from these documents. Fluctuations in on-board mains voltage hamper the precision of evaluation, especially when this method is used in vehicles. The circuit expense necessary for comparing such interference is considerable with all compensation methods, however interference cannot ultimately be implied.

DE 197 29 238 A1 discloses a method for detecting the speed and/or the angle of rotation in mechanically switched direct-current motors. Measuring is complemented and controlled by a parallel working motor status model from the time sequence of the ripple of the motor current occurring in commutation. The electromechanical motor equations form the basis of the motor status model. A probable value of the current speed is extrapolated from the motor current and the motor voltage and a reliable nominal value range of the next commutation is determined. If no commutation moment is determined in the nominal value range, the extrapolated value is used. Otherwise the current speed is determined as accurately as possible from the commutation moment detected in the nominal value range. The motor-specific and load-dependent variable required for the motor status model can be firmly preset or can be adapted to the current speed in each case following detection of commutation procedures.

The aim of the invention is to provide a method for the most exact possible determining of the position of a rotor of a mechanically switched direct-current motor, and a method for sensorless detection of the speed and/or angle of rotation of a mechanically switched direct-current motor, which reduces the expense of compensation by influences of the mains voltage and improves the interference resistance.

SUMMARY OF THE INVENTION

The task is solved by a method for detecting the current position of a rotor, in particular the angle of rotation of the rotor, of an electromotor. The current value of the armature resistance ($R_{est}(t)$) or respectively conductance of the electromotor is determined continuously in time (t) and the current position (Theta/$\theta$) of the rotor of the electromotor is determined via the current value of the armature resistance ($R_{est}(t)$) or respectively armature conductance of the electromotor. The task is also solved by a method for detecting the speed and/or angle of rotation (Theta/$\theta$) of an electromotor. The current value of the armature resistance ($R_{est}(t)$) or respectively armature conductance of the electromotor is determined continuously in time. The average value ($R_{mean}$) is determined therefrom. The current value of the armature resistance ($R_{est}(t)$) or respectively armature conductance is compared to the average value ($R_{mean}$) and the speed and/or angle of rotation of the electromotor is determined therefrom by changing the armature resistance ($R_{est}(t)$) or respectively armature conductance of the electromotor with respect to the average value ($R_{mean}$). Advantageous further developments of the invention are to be taken from the description and the figures.

The fundamental idea in the most exact possible determining of the position of a rotor of a mechanically switched direct-current motor, or respectively in the sensorless detection of the speed and/or angle of rotation of a mechanically switched direct-current motor, is not to employ the ripple of the motor current of the electromotor for determining, but to switch off the inner resistance of the electromotor, in particular the armature resistance or respectively the corresponding conductance, and use this for analysis. The position of the rotor of the mechanically switched electromotor or respectively of the angle of rotation and the speed of the mechanically switched electromotor is determined by way of the ripple of the armature resistance or respectively armature conductances of the electromotor.

Here both the armature voltage and the armature current of the mechanically switched direct-current electromotor are determined.

This procedure constitutes complete avoidance of the previous method, because up to now the view was held in technical circles that detecting the speed and the angle of rotation, and thus the current position of an element movable by the electromotor, is not possible by means of analysis of the armature resistance. To date, analysis of the ripple of the motor current was always used.

For detecting the speed and/or the angle of rotation of an electromotor the current value of the armature resistance or respectively armature conductance of the electromotor is determined continuously in time and the average value is ascertained therefrom. The average value is preferably determined over a number of instances of commutation or even via several revolutions of the motor or continuously.

The current value of the armature resistance or respectively armature conductance is compared to the corresponding average value, therefore the current value of the armature resistance is compared to the average value of the armature resistance and the current value of the armature conductance is compared to the average value of the armature conductance. The speed and/or angle of rotation of the electromotor is determined by means of the change recognisable by this comparison in the armature resistance or respectively armature conductance of the electromotor with respect to the average value.

The speed and/or angle of rotation of the electromotor is preferably derived, in that c1) the number of agreements of the current value with the average value is determined or c2) the current value of the armature resistance or respectively armature conductance is compared to the average value in a comparator, whereby the comparative signal represents the sign-affected comparison result and the number of zero crossings is determined, or c3) the current value of the armature resistance or respectively armature conductance with the average value is subtracted and the number of zero crossings in the subtraction signal is determined.

The number determined in steps c1), c2) or c3) corresponds in each case to the number of commutations made in this timeframe, from which the speed and/or angle of rotation of the electromotor is again implied. Steps c1 to c3 therefore represent alternatives.

The variables required for the preferably used motor status model and parameters are either firmly preset or are derived and correspondingly adapted from operation of the mechanically switched direct-current electromotor.

The electromotor status model of the mechanically switched direct-current electromotor is based on the following state equation:

$$u = R*i + L*\frac{di}{dt} + E$$

The impedance of the mechanically switched direct-current electromotor can already be determined in the startup time prior to overcoming the static friction, since in this case the speed is still not zero and no induced armature voltage is present. Repeated logging of motor current and motor voltage helps adapt the value of the motor impedance and errors are thus extensively excluded. Also the temperature- and load-dependent motor-specific variable can be redetermined after each commutation procedure and the influence of temperature and load can be considered for the following extrapolation. If the work duration of the motor is to be relatively brief, the motor-specific variable can also remain over the entire work duration on the firmly preset value, because the thermal influence in particular runs accordingly very much more slowly and weakly.

The method for sensorless position detection is based on ascertaining the armature resistance or respectively the reciprocal conductance, present through the inner windings of the rotor. The current uptake and the voltage on the mechanically switched direct-current electromotor are measured to determine the armature resistance. It is significant here that fluctuations in the on-board power supply barely influence the results of the inventive method and are substantially compensated with further processing and in particular via the inventive method.

The temporal sequence of the armature resistance of the electromotor is implied by the motor current and the motor voltage and other parameters, such as motor inductivity and/or flow constant of the electromotor.

BRIEF DESCRIPTION OF THE DRAWINGS

The other method will now be explained in greater detail for better comprehension by means of figures. Reference is made hereinafter to a mechanically switched direct-current electromotor, by means of which the invention is explained in greater detail.

DETAILED DESCRIPTION OF THE DRAWINGS

Since the time sequence of the armature resistance or respectively conductance of the mechanically switched direct-current electromotor depends on the position of the rotor of the electromotor and the mechanical commutation elements (brushes), there is no continuous course of the armature resistance. Rather, this changes when the rotor revolves, and thus also within a revolution over time.

Figure 1:
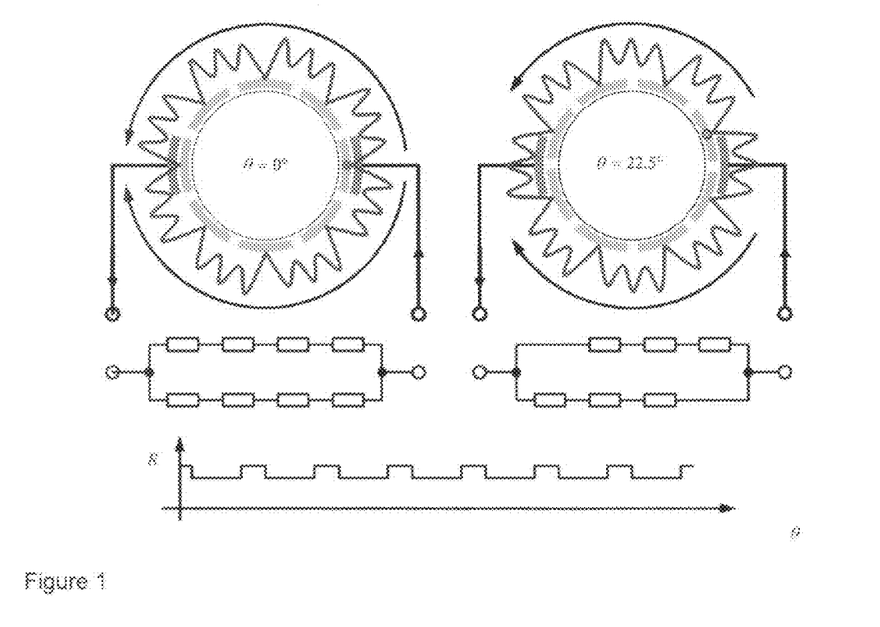
FIG. 1 is a schematic illustration of a mechanically switched direct-current electromotor and its schematic status image of the armature resistance.

FIG. 1 schematically illustrates a mechanically commutated direct-current electromotor, at the left with an angle of rotation θ of 0°, and at the right with θ of 22.5°. Shown under the mechanically switched direct-current electromotor is a schematic illustration of the associated armature resistance of the mechanically switched direct-current electromotor, depending on the angle of rotation of the rotor of the mechanically switched direct-current electromotor. Shown beneath this illustration is the schematic course more ideally of the armature resistance over the angle of rotation θ of the rotor.

Figure 2:
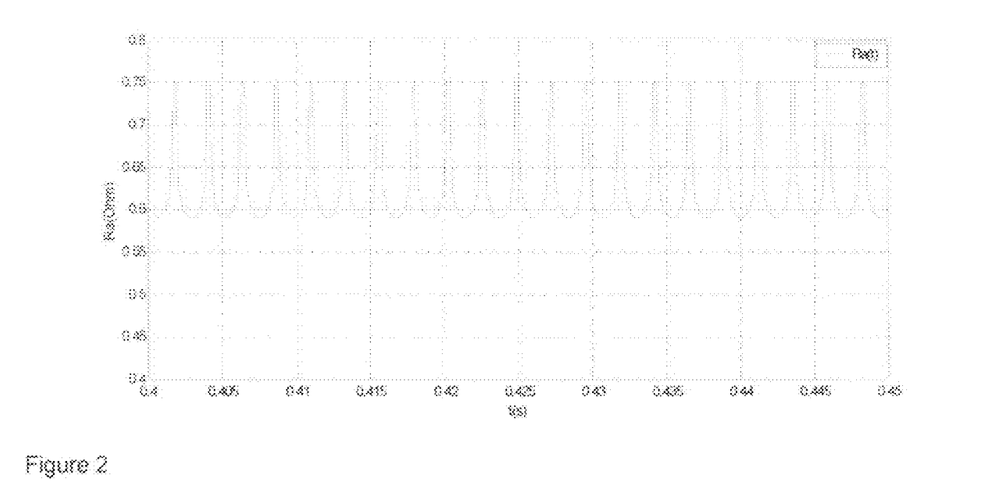
FIG. 2 shows the time sequence of the armature resistance of a mechanically switched direct-current electromotor with constant speed.

The armature resistance can be shown when the rotor is running as a non-linear variable over time, evident by way of example from FIG. 2.

It eventuates that the armature resistance does not alter linear over time, rather it changes depending on the respective position of the rotor of the mechanically switched direct-current electromotor. Due to this non-linearity of the armature resistance ripples inevitably result in the armature resistance over time. It so happens that the armature resistance is a function of the angle of rotation of the rotor and thus also of time, relative to a revolution of the rotor through 360°.

Figure 3:
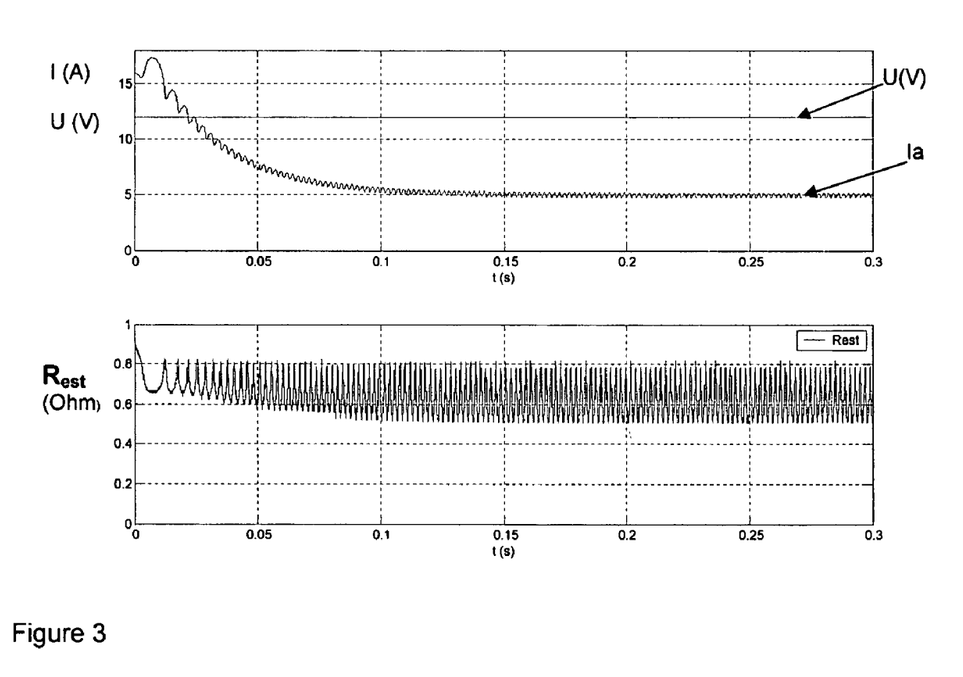
FIG. 3 is an illustration of the voltage, the current and the armature resistance.

If the motor inductivity, the flow constant of the mechanically switched direct-current electromotor and the other parameters are known, in particular the current motor current and the voltage currently on the mechanically switched direct-current electromotor, the armature resistance can be calculated. The result of such a calculation is illustrated by way of example in FIG. 3, whereby the motor current in FIG. 3 is accepted as ideally constant. FIG. 3 shows the voltage on the electromotor, as well as the absorbed current, applied over time; underneath is the calculated armature resistance, likewise applied over time.

As is obvious, the ripple of the armature resistance is more pronounced than the ripple of the voltage on the mechanically switched direct-current electromotor. Also, fluctuations in the on-board power supply are actually disabled by the calculation of the armature resistance. Considering the ripple of the armature resistance delivers a qualitatively improved result in particular for later signal evaluation compared to considering the ripple of the current.

If the armature resistance of the electromotor is identified as a signal, it is no longer dependent on the voltage, because the armature resistance or respectively its change depends only on the angle of rotation of the rotor. For this reason changes in voltage e.g. via "on-board peaks" have no influence on signal evaluation. The same applies for the armature conductance reciprocal with the armature resistance.

To now derive from the armature resistance the position of the rotor of the mechanically switched direct-current electromotor, and also the speed and of the angle of rotation of the mechanically switched direct-current electromotor, the temporally current value of the armature resistance is compared to the average value of the armature resistance, resulting as average value from the sum of the temporal values of the armature resistance.

This comparison is preset in an advantageous configuration of the invention by a comparator, which compares the chronologically detailed values of the armature resistance to the average value of the armature resistance. The result of this comparison, i.e. the output signal of the comparator is illustrated in FIG. 4.

Figure 4A:
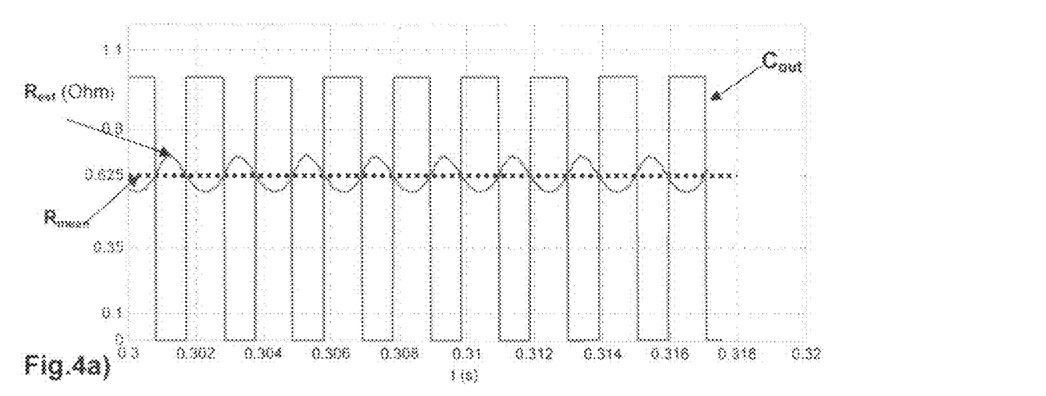
FIG. 4 is an illustration of the output signal of a comparator for which the currently determined armature resistance is present as input signal and the average value of the chronologically determined armature resistances is present as comparative signal.

FIG. 4 a) clarifies that the armature resistance and thus also the conductance over the revolutions exhibit an extensive periodic course in the form of a vacillation by a considerably constant average value. If the average value changes under modified environmental conditions, these changes are however negligible at least in relation to the duration of one revolution or certainly one commutation procedure. The average value preferable serves as a reference variable, whereby alternatively also another mathematical assessment, for example a maximum/minimum assessment or the like are conceivable for assessment of these periodical changes in the armature resistance or respectively armature conductance.

A comparison of both variables can be made by way of the average value for example and the number of agreements of the current value ($R_{est}(t)$) with the average value ($R_{mean}$) determined. For this, a comparator for example can be used, whereby a comparative signal ($C_{out}$) represents the sign-affected result of the comparison and the number of the zero crossings ($C_{out}=0$) (cf. also FIG. 4c) is ascertained.

Figure 4B:
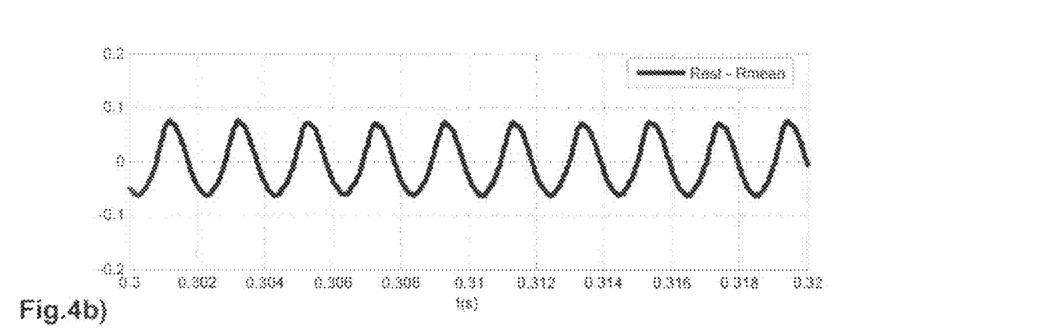
Figure 4C:
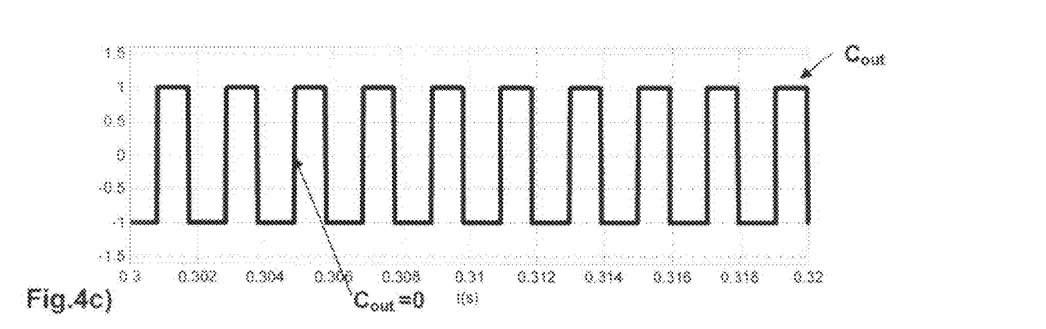

In principle, the equivalent is to subtract the current value of the armature resistance ($R_{est}(t)$) or respectively armature conductance with the average value from one another ($R_{est}(t)-R_{mean}$), as shown in FIG. 4b) and to determine the number of zero crossings ($0=R_{est}(t)-R_{mean}$) in the subtraction signal.

The speed and/or angle of rotation of the electromotor are preferably derived, in that c1) the number of agreements of the current value ($R_{est}(t)$) with the average value ($R_{mean}$) are determined, or c2) the current value ($R_{est}(t)$) of the armature resistance or respectively armature conductance with the average value ($R_{mean}$) are compared in a comparator, whereby a comparative signal ($C_{out}$) represents the sign-affected result of the comparison and the number of zero crossings ($C_{out}=0$) is determined, or c3) the current value of the armature resistance ($R_{est}(t)$) or respectively armature conductance and the average value are subtracted from one another ($R_{est}(t)-(R_{mean})$) and the number of zero crossings ($0=R_{est}(t)-(R_{mean})$) in the subtraction signal is determined.

The number determined in steps c1), c2) or c3) in each case corresponds to the number of the commutations made in this time period, from which the speed and/or the angle of rotation of the electromotor is implied. Steps c1 to c3 therefore represent preferred configurations for detecting changes in the current value of the armature resistance, whereby the average value is used as reference point.

Figure 5:
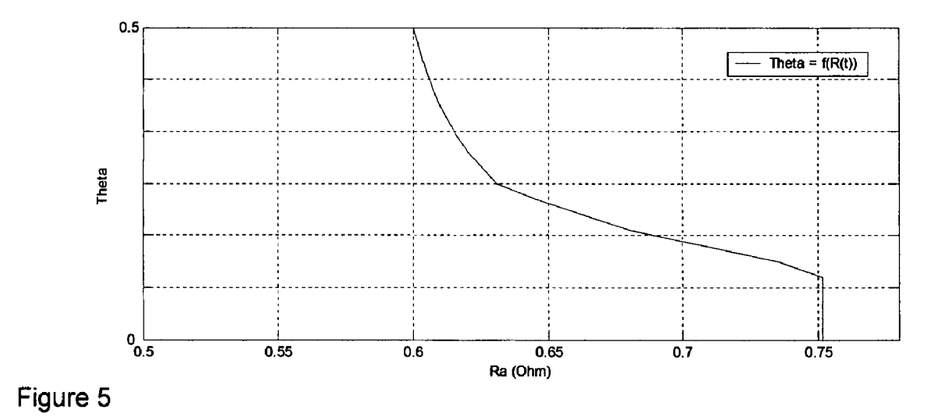
FIG. 5 is a graphic illustration of a look-up table for determining the position of the rotor.

It has proven to be particularly advantageous to verify the obtained values via a look-up table to obtain better resolution with respect to the position of the rotor of the mechanically switched direct-current electromotor. A more precise determining of position can thus be undertaken. The characteristic line of the angular position Theta underlying the look-up table is illustrated in FIG. 5 by the armature resistance. The value 1 Theta at the same time corresponds to the revolution between two commutation procedures (ripples). As shown in FIG. 5, for the rising and falling flank in good approximation a common characteristic line can be used, so that the look-up table requires correspondingly less storage space.

The angle of rotation of the mechanically switched direct-current electromotor can thus be determined by use of the look-up table.

The speed of the mechanically switched direct-current electromotor can be ascertained simply and precisely via a counter, not illustrated here, which counts the zero crossings of the output of the comparator (shown in FIG. 4 as $C_{out}$).

Figure 6:
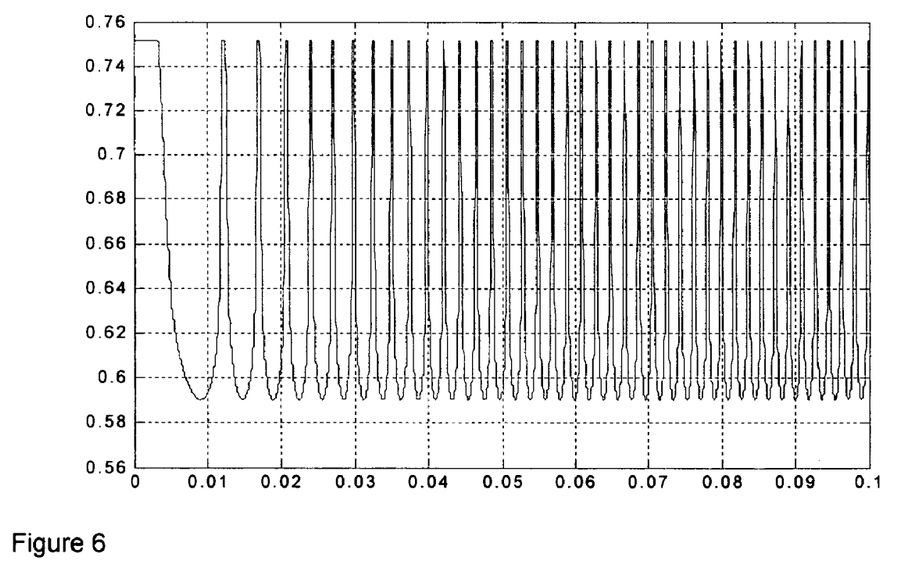
FIG. 6 shows an illustration of the values of the armature resistance of a mechanically switched direct-current electromotor over time for several revolutions of the mechanically switched direct-current electromotor.
Figure 7:
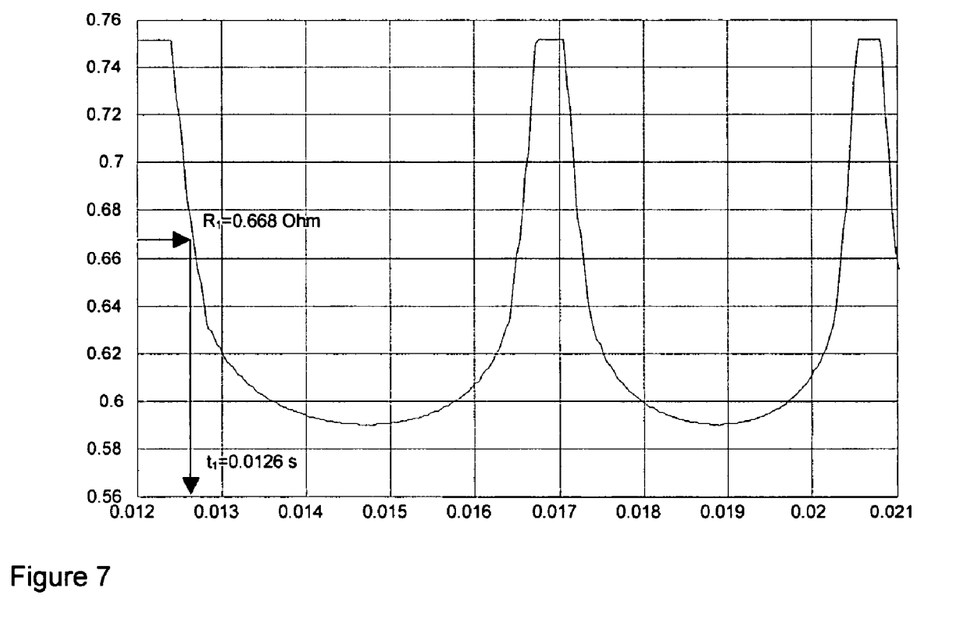
FIG. 7 shows an enlarged section of FIG. 6.
Figure 8:
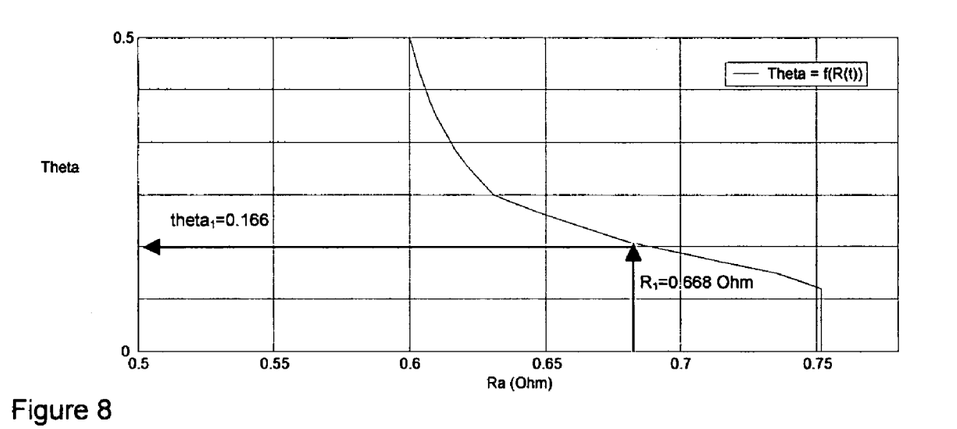
FIG. 8 schematically shows the evaluation by means of a look-up table.

To once again more clearly illustrate the advantages of the look-up table, the armature resistance of a mechanically switched direct-current electromotor over time is shown again in FIG. 6 and FIG. 7 by way of example, whereby an enlarged partial section of FIG. 6 is shown in FIG. 7. Over the temporal course of the armature resistance the values in the look-up table—see FIG. 8—are also preferably substantiated. After some time these values are very stable.

However, the values underlying the look-up table can also be preset, so that these standard values are already deposited ex works. These values can also be further changed by the determined values when the mechanically switched direct-current electromotor is operating, i.e. adapted to altered operating conditions.

Even more exact position determination of the rotor can be made than is possible alone from counting the commutation procedures by means of the values of the armature resistance via the look-up table.

Figure 9:
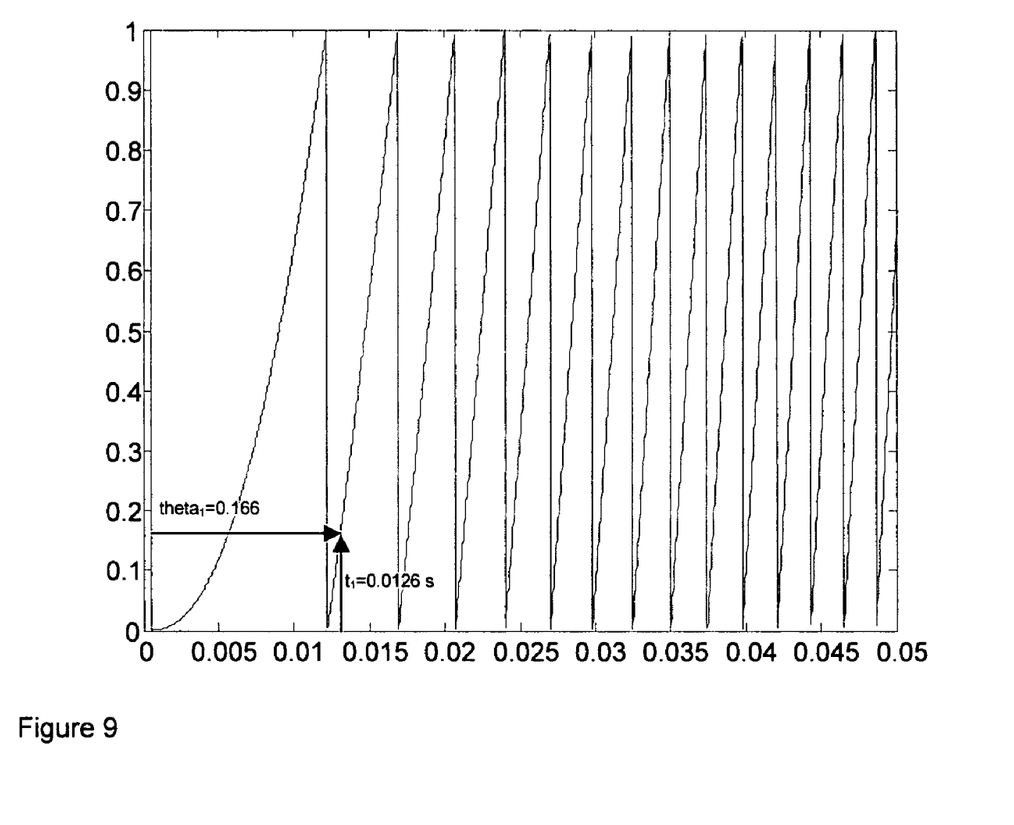
FIG. 9 is an illustration of the angle of rotation of the mechanically switched direct-current electromotor over time by means of the look-up table of FIG. 8.

Via the look-up table the function of the angle of rotation (Theta) can be depicted as a function of time, as illustrated by FIG. 9, and not only per commutation step, but also corresponding to the number of values in the look-up table also between the individual commutation steps.

The invention claimed is:

1. A method for detecting a current position of a rotor of a mechanically switched electromotor, the method comprising:
   determining a current value of an armature resistance (Rest(t)) continuously in time (t) for an armature of a mechanically switched electromotor;
   determining the current position (Theta/θ) of the rotor of the mechanically switched electromotor based on the current value of the armature resistance (Rest(t));
   determining an average value (Rmean) of the armature resistance and comparing the determined value of the armature resistance (Rest(t)) to the average value (Rmean), wherein the number of agreements of the current value of the armature resistance (Rest(t)) with the average value (Rmean) of the armature resistance is determined and utilized for determining the current position (Theta/θ) of the rotor.

2. The method as recited in claim 1, wherein the current value of the armature resistance (Rest(t)) is compared to the average value (Rmean) of the armature resistance in a comparator to generate a comparative signal that represents a sign-affected comparison result and a number of zero crossing that are utilized for determining the current position (Theta/9) of the rotor.

3. A method for detecting at least one of a speed or angle of rotation (Theta/θ) of an electromotor, the method comprising:
   determining a current value of the armature resistance (Rest(t)) or armature conductance of the electromotor continuously in time;
   determining an average value (Rmean) of the armature resistance (Rest(t)) or armature conductance of the electromotor;
   comparing the current value of the armature resistance (Rest(t)) or armature conductance to the average value (Rmean);
   determining at least one of the speed or angle of rotation of the electromotor by changing the armature resistance (Rest(t)) or armature conductance of the electromotor with respect to the average value (Rmean);
   comparing the determined value of the armature resistance (Rest(t)) to the average value (Rmean), wherein the number of agreements of the current value of the armature resistance (Rest(t)) with the average value (Rmean) of the armature resistance is determined and utilized for determining the current position (Theta/θ) of the rotor.

4. The method of claim 3, further comprising:
   determining a number of agreements of the current value (Rest(t)) with the average value (Rmean); or
   comparing the current value (Rest(t)) of the armature resistance or armature conductance to the average value (Rmean) in a comparator, wherein a comparative signal (Cout) represents the sign-affected result of the comparisons and the number of zero crossings (Cout=0) is determined; or
   subtracting the current value of the armature resistance (Rest(t)) or armature conductance with the average value from one another (Rest(t)−Rmean) and the number of zero crossings (0=Rest(t)−Rmean) in the subtraction signal is determined; and
   deriving the speed or angle of rotation of the electromotor from the number determined in the previous steps.

5. The method of claim 3, wherein the current value of the armature resistance (Rest(t)) or respectively conductance is determined by means of the current absorbed by the electromotor, the applied voltage and at least one other parameter.

6. The method of claim 3, wherein the armature current is used as absorbed current and the armature voltage is used as applied voltage.

7. The method of claim 3, wherein the electromotor is a mechanically commutated direct-current electromotor.

8. The method of claim 3, wherein a ripple of the armature resistance (Rest(t)) or respectively conductance is employed for analysis.

9. The method of claim 3, wherein a motor inductivity and/or a flow constant of the electromotor is utilized for determining at least one of a current of the armature resistance and an average value of the armature resistance.

10. The method of claim 3, the position of the element moved by the electromotor is determined by means of the speed, the angle of rotation and/or the position of the rotor of the electromotor.

11. The method of claim 10, wherein the elements moved by the electromotor are a slide roof, a window or a door in a vehicle.

12. A method for detecting at least one of a speed or angle of rotation (Theta/θ) of an electromotor, the method comprising:
   determining a current value of the armature resistance (Rest(t)) or armature conductance of the electromotor continuously in time;
   determining an average value (Rmean) of the armature resistance (Rest(t)) or armature conductance of the electromotor;
   comparing the current value of the armature resistance (Rest(t)) or armature conductance to the average value (Rmean); and
   determining at least one of the speed or angle of rotation of the electromotor by changing the armature resistance (Rest(t)) or armature conductance of the electromotor with respect to the average value (Rmean), wherein a look-up table is created for values of the armature resistance (Rest(t)) or conductance, which are present temporally with revolution of the electromotor or respectively rotor of the electromotor.

13. The method of claim 12, wherein the values of the look-up table are adapted continuously by means of the determined values of the armature resistance (Rest(t)) or respectively conductance.

14. The method of claim 12, wherein the values of the look-up table are preset.

* * * * *